US011980297B2

(12) United States Patent
Zhang

(10) Patent No.: US 11,980,297 B2
(45) Date of Patent: May 14, 2024

(54) MEMORY FOAM CUSHION BODY AND MEMORY FOAM SEAT CUSHION

(71) Applicant: Yi Zhang, Xiamen (CN)

(72) Inventor: Yi Zhang, Xiamen (CN)

( * ) Notice: Subject to any disclaimer, the term of this patent is extended or adjusted under 35 U.S.C. 154(b) by 0 days.

(21) Appl. No.: 18/470,477

(22) Filed: Sep. 20, 2023

(65) Prior Publication Data

US 2024/0000237 A1 Jan. 4, 2024

(51) Int. Cl.

| | |
|---|---|
| ***A47C 7/02*** | (2006.01) |
| ***A47C 5/12*** | (2006.01) |
| ***A47C 7/20*** | (2006.01) |
| ***A47C 7/62*** | (2006.01) |
| ***A47C 7/74*** | (2006.01) |
| ***A47C 31/11*** | (2006.01) |
| ***A61G 5/10*** | (2006.01) |
| ***A61H 15/00*** | (2006.01) |
| ***A61H 23/02*** | (2006.01) |

(52) U.S. Cl.

CPC ................ *A47C 7/021* (2013.01); *A47C 5/12* (2013.01); *A47C 7/029* (2018.08); *A47C 7/20* (2013.01); *A47C 7/748* (2013.01); *A47C 31/116* (2013.01); *A61G 5/1045* (2016.11); *A61H 15/00* (2013.01); *A61H 23/0263* (2013.01); *A61H 2201/0134* (2013.01)

(58) Field of Classification Search

CPC ........... A47C 7/748; A47C 5/12; A47C 7/021; A47C 7/029; A47C 7/20; A47C 31/116; A61G 5/1045; A61H 23/0263; A61H 2201/0134

USPC ... 297/217.4, 219.1, 452.21–452.27, 452.42, 297/452.48, DIG. 3; 5/654, 655.5, 421, 5/933, 944

See application file for complete search history.

(56) References Cited

U.S. PATENT DOCUMENTS

| | | | | |
|---|---|---|---|---|
| 5,226,188 A * | 7/1993 | Liou | A47C 7/742 | 5/653 |
| 5,749,111 A * | 5/1998 | Pearce | B29C 48/11 | 428/137 |
| 6,760,937 B1 * | 7/2004 | Ou | A47C 31/005 | 5/641 |
| 8,359,689 B2 * | 1/2013 | Warren | A47C 27/144 | 5/730 |
| 8,668,977 B2 * | 3/2014 | Callsen | A47C 27/144 | 428/158 |
| D840,724 S * | 2/2019 | Dowd | D6/601 | |

(Continued)

FOREIGN PATENT DOCUMENTS

| | | | |
|---|---|---|---|
| KR | 102173497 B1 * | 11/2020 | A47C 7/24 |
| KR | 102260087 B1 * | 6/2021 | A47C 27/002 |
| KR | 20220059988 A * | 5/2022 | A47C 27/144 |

*Primary Examiner* — Robert Canfield

(74) *Attorney, Agent, or Firm* — Zhigang Ma

(57) ABSTRACT

The present disclosure provides a memory foam cushion body and a memory foam seat cushion. The memory foam cushion body includes a memory foam main body and supporting silicone. The memory foam main body is provided with an upper surface and a lower surface. The supporting silicone is arranged on the upper surface of the memory foam main body; the supporting silicone is provided with a through hole penetrating through an upper surface and a lower surface of the supporting silicone; and an air layer is formed between the upper surface of the supporting silicone, an inner wall of the through hole, and the upper surface of the memory foam main body.

16 Claims, 12 Drawing Sheets

(56) References Cited

U.S. PATENT DOCUMENTS

| | | | | |
|---|---|---|---|---|
| D908,394 | S * | 1/2021 | Yin | D6/601 |
| D911,071 | S * | 2/2021 | Yu | D6/601 |
| 11,246,421 | B2 * | 2/2022 | Cai | A47C 7/021 |
| D950,981 | S * | 5/2022 | Luo | D6/601 |
| 11,491,064 | B2 * | 11/2022 | Lafleche | A61G 7/05707 |
| D976,614 | S * | 1/2023 | Dowd | D6/601 |
| D990,928 | S * | 7/2023 | Yu | D6/601 |
| 11,718,209 | B2 * | 8/2023 | Wittenschlaeger | B60N 2/502 297/452.48 |
| 2004/0098806 | A1 * | 5/2004 | Stender | A47C 7/021 5/655.9 |
| 2004/0200003 | A1 * | 10/2004 | Kuo | A47G 9/10 5/948 |
| 2004/0211005 | A1 * | 10/2004 | Kuo | A47C 27/12 5/655.5 |
| 2007/0261173 | A1 * | 11/2007 | Schlussel | D04B 21/14 5/725 |
| 2009/0033130 | A1 * | 2/2009 | Marquette | A47C 7/74 297/180.15 |
| 2009/0058167 | A1 * | 3/2009 | San Miguel | B29C 33/424 297/452.48 |
| 2013/0000045 | A1 * | 1/2013 | Losio | A47C 27/085 5/655.5 |
| 2013/0257132 | A1 * | 10/2013 | Chen | A47C 7/021 297/452.21 |
| 2013/0269113 | A1 * | 10/2013 | Wood | A47C 27/14 5/691 |
| 2015/0257540 | A1 * | 9/2015 | Chandler | A47C 7/748 136/204 |
| 2015/0335168 | A1 | 11/2015 | Favata et al. | |
| 2016/0152168 | A1 | 6/2016 | Ito et al. | |
| 2017/0295945 | A1 * | 10/2017 | Stickler | A47C 27/15 |
| 2018/0140100 | A1 | 5/2018 | Cribbs | |
| 2019/0183249 | A1 * | 6/2019 | Oomen | A47C 7/74 |
| 2021/0345797 | A1 * | 11/2021 | Sun | A47G 9/1036 |
| 2023/0011750 | A1 * | 1/2023 | Chan | A61F 7/02 |
| 2023/0270263 | A1 * | 8/2023 | Stojanovic | A47C 27/086 5/654 |

* cited by examiner

MEMORY FOAM CUSHION BODY AND MEMORY FOAM SEAT CUSHION

TECHNICAL FIELD

The present disclosure relates to the technical field of cushion bodies, and in particular, to a memory foam cushion body and a memory foam seat cushion.

BACKGROUND

For comfort and safety, cushion bodies are widely used in people's daily lives, such as mattresses, seat cushions, and back cushions. These cushion bodies are usually covered with cloth or leather and filled with sponge, cotton, or down feather. Memory foam can maintain a fixed shape due to its slow recovery characteristic, so that a cushion body can continue to abut against the human body. Memory foam cushion bodies are particularly popular.

However, memory foam mattresses in the current market commonly have following problems. Due to a compact structure, poor thermal conductivity, and poor breathability, memory foam easily accumulates heat. Especially in summer, when high temperature weather persists, if a memory foam product is used, a user has a poor experience because of the poor thermal conductivity and the poor breathability of the memory foam. Sitting on a memory foam cushion body for long time can easily lead to skin diseases such as heat rash and hemorrhoids. Moreover, a memory product will also change in hardness as an environmental temperature changes. When the temperature drops, the memory product will become harder and less comfortable.

Therefore, the present disclosure provides a memory foam cushion body and a memory foam seat cushion, which can effectively solve the above problems and achieve a simple structure and good breathability.

SUMMARY

In order to overcome the shortcomings of the prior art, the present disclosure provides a memory foam cushion body, which has a simple structure and good breathability.

The technical solutions adopted by the present disclosure to solve the technical problem are as follows.

The present disclosure provides a memory foam cushion body, including:

a memory foam main body, wherein the memory foam main body is provided with an upper surface and a lower surface; and supporting silicone, wherein the supporting silicone is arranged on the upper surface of the memory foam main body; the supporting silicone is provided with a through hole penetrating through an upper surface and a lower surface of the supporting silicone; and an air layer is formed between the upper surface of the supporting silicone, an inner wall of the through hole, and the upper surface of the memory foam main body.

As the improvement of the present disclosure, the memory foam cushion body further includes a connecting net, wherein one side of the connecting net is connected to the upper surface of the memory foam main body, and the other side of the connecting net is connected to the lower surface of the supporting silicone.

As the improvement of the present disclosure, the through hole is hexagonal, so that the supporting silicone is honeycomb-shaped.

As the improvement of the present disclosure, the memory foam cushion body further includes a massage component, wherein the massage component is arranged in the memory foam main body; and a working surface of the massage component is arranged in a manner of facing the upper surface of the memory foam main body.

As the improvement of the present disclosure, the massage component includes a massage member and a vibration member; and the massage member and the vibration member are arranged side by side in the memory foam main body.

As the improvement of the present disclosure, the massage member includes several massage heads; and the massage heads are arranged in a manner of facing the upper surface of the memory foam main body.

As the improvement of the present disclosure, the vibration member includes a shell, a motor, and an eccentric block; the eccentric block is connected to an output end of the motor; the motor and the eccentric block are arranged in the shell; the motor drives the eccentric block to rotate; and the eccentric block drives the motor and the shell to vibrate.

As the improvement of the present disclosure, the memory foam cushion body further includes a heating component, wherein the heating component is arranged on the upper surface of the supporting silicone.

As the improvement of the present disclosure, the heating component includes supporting cloth and a heating member; and the heating member is connected to the supporting cloth and uniformly fully distributed in the supporting cloth.

As the improvement of the present disclosure, the heating member consists of one or more of resistance wire, carbon fiber, and graphene.

As the improvement of the present disclosure, the memory foam cushion body further includes an air bag component. At least part of the air bag component is arranged in the memory foam main body. The air bag component can expand or retract according to inflation and deflation situations.

As the improvement of the present disclosure, the air bag component includes an air bag, an air hose, and an inflation and deflation device. The air bag is arranged in the memory foam main body. One end of the air hose is communicated to the air bag, and the other end of the air hose is threaded out of the memory foam main body and is communicated to the inflation and deflation device.

As the improvement of the present disclosure, the memory foam cushion body further includes a wire control device. The wire control device is electrically communicated to the massage component and the heating component. The wire control device is configured to control the massage component and the heating component.

The present disclosure also provides a memory foam seat cushion, including:

a memory foam main body, wherein the memory foam main body is provided with an upper surface and a lower surface, and the upper surface of the memory foam main body is provided with an accommodating slot;

supporting silicone, wherein at least part of the supporting silicone is arranged in the accommodating slot; the supporting silicone is provided with a through hole penetrating through an upper surface and a lower surface of the supporting silicone; the upper surface of the supporting silicone is exposed out of the accommodating slot; and an air layer is formed between the upper surface of the supporting silicone, an inner wall of the through hole, and the upper surface of the memory foam main body.

As the improvement of the present disclosure, the memory foam seat cushion further includes a connecting net, wherein one side of the connecting net is connected to an inner wall of the accommodating slot, and the other side of the connecting net is connected to the lower surface of the supporting silicone.

As the improvement of the present disclosure, the through hole is hexagonal, so that the supporting silicone is honeycomb-shaped.

As the improvement of the present disclosure, the memory foam seat cushion further includes a massage component, wherein an accommodating cavity is arranged in the memory foam main body; the massage component is arranged in the accommodating cavity; and a working surface of the massage component is arranged in a manner of facing the upper surface of the memory foam main body.

As the improvement of the present disclosure, the massage component includes a massage member and a vibration member; and the massage member and the vibration member are arranged side by side in the memory foam main body.

As the improvement of the present disclosure, the massage member includes several massage heads; and the massage heads are arranged in a manner of facing the upper surface of the memory foam main body.

As the improvement of the present disclosure, the vibration member includes a shell, a motor, and an eccentric block; the eccentric block is connected to an output end of the motor; the motor and the eccentric block are arranged in the shell; the motor drives the eccentric block to rotate; and the eccentric block drives the motor and the shell to vibrate.

As the improvement of the present disclosure, the memory foam seat cushion further includes a heating component, wherein the heating component is arranged on the upper surface of the supporting silicone.

As the improvement of the present disclosure, the heating component includes supporting cloth and a heating member; and the heating member is connected to the supporting cloth and uniformly fully distributed in the supporting cloth.

As the improvement of the present disclosure, the heating member consist of one or more of resistance wire, carbon fiber, and graphene.

As the improvement of the present disclosure, the memory foam seat cushion further includes an air bag component. At least part of the air bag component is arranged in the memory foam main body. The air bag component can expand or retract according to inflation and deflation situations.

As the improvement of the present disclosure, the air bag component includes an air bag, an air hose, and an inflation and deflation device. The air bag is arranged in the memory foam main body. One end of the air hose is communicated to the air bag, and the other end of the air hose is threaded out of the memory foam main body and is communicated to the inflation and deflation device.

As the improvement of the present disclosure, the memory foam seat cushion further includes a wire control device. The wire control device is electrically communicated to the massage component and the heating component. The wire control device is configured to control the massage component and the heating component.

Beneficial effects: Due to the arrangement of the above structure, during use, the body of a user is in contact with the upper surface of the supporting silicone, and the upper surface of the supporting silicone supports the body of the user. The supporting silicone is provided with the through hole penetrating through the upper surface and the lower surface of the supporting silicone, so that the air layer formed by air exists between the surface of the body of the user and the upper surface of the memory foam main body. Thus, this product can prevent direct contact between memory foam and the body of the user while retaining the characteristic of slow recovery of a memory foam products. The air layer formed by the air can improve the breathability of the cushion body product and also prevent heat from being accumulated on the surfaces of the memory foam main body, so that the user experience is improved.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
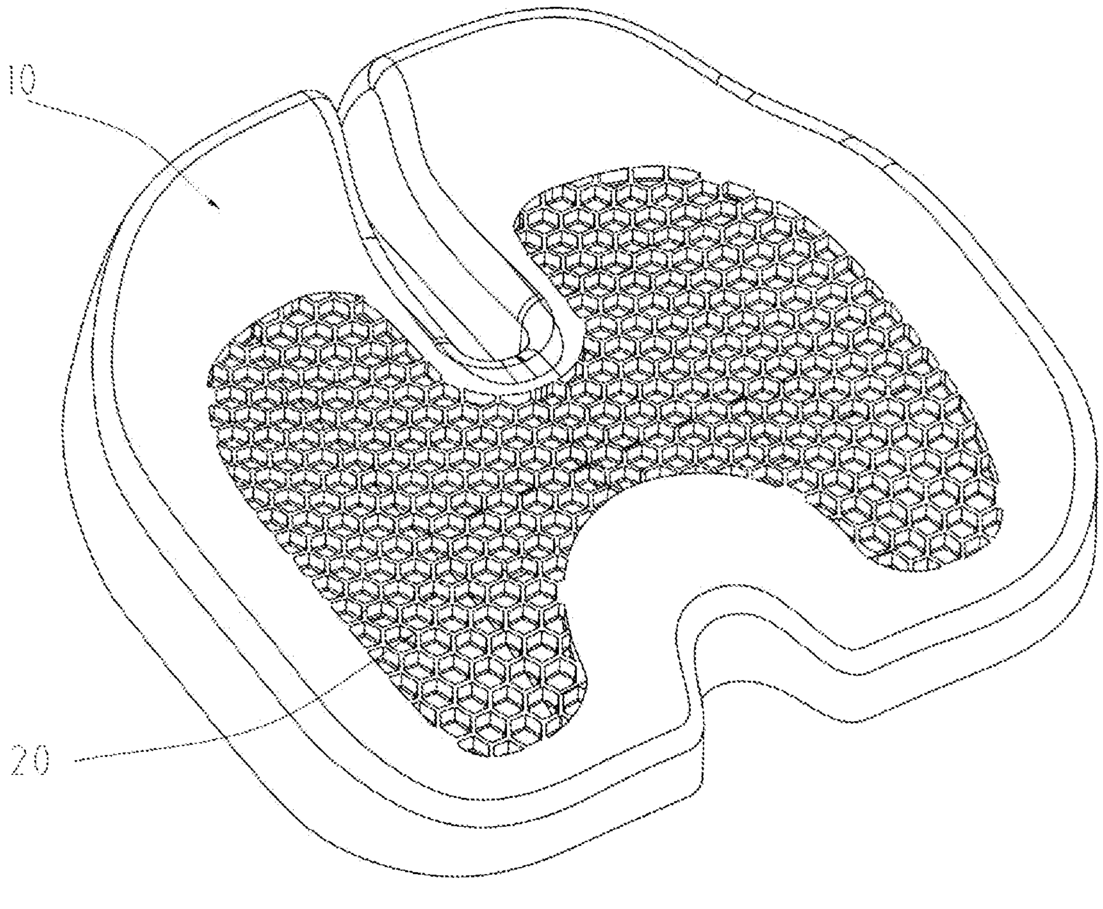
FIG. 1 is a schematic structural diagram of a seat cushion according to the present disclosure.
Figure 2:
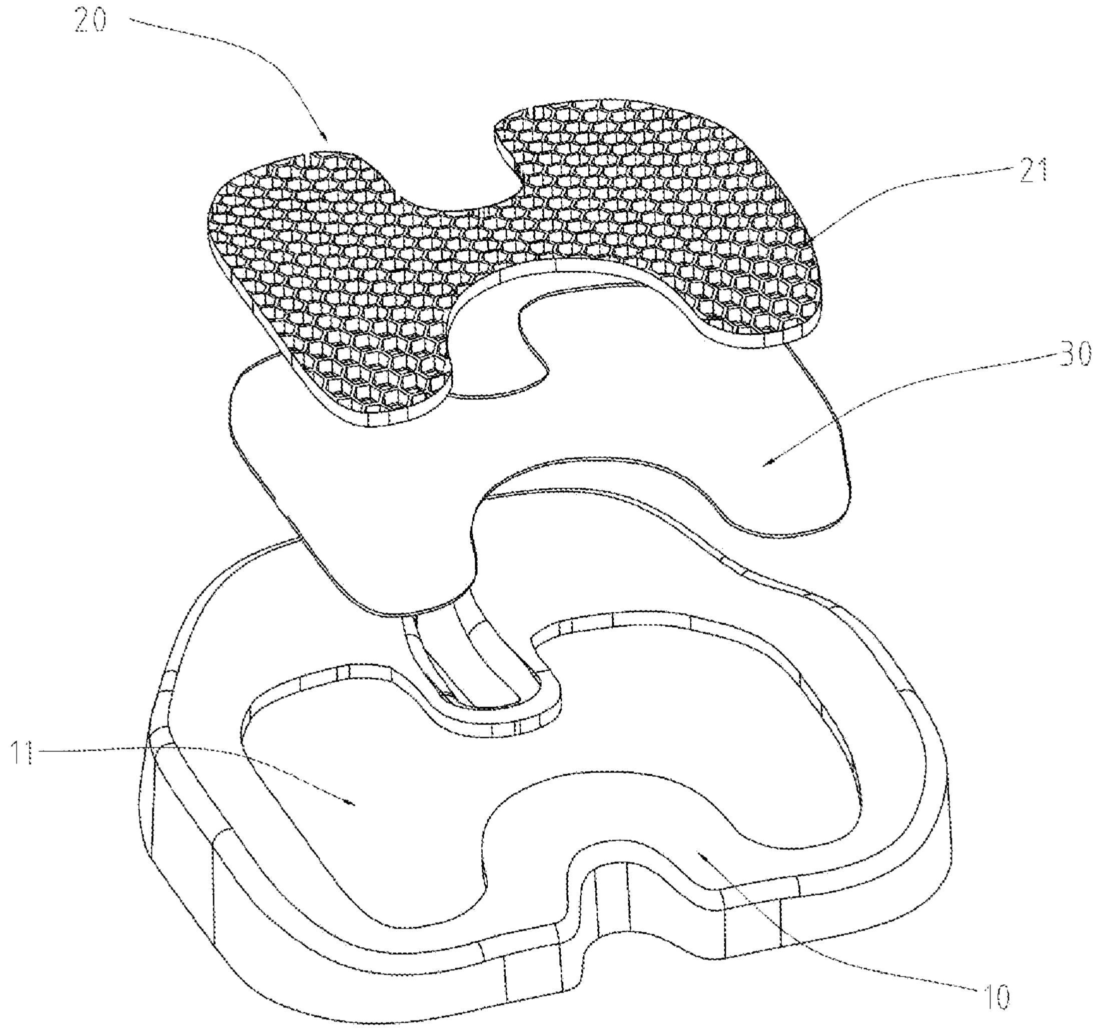
FIG. 2 is a schematic structural diagram of an exploded view of a seat cushion according to the present disclosure.
Figure 3:
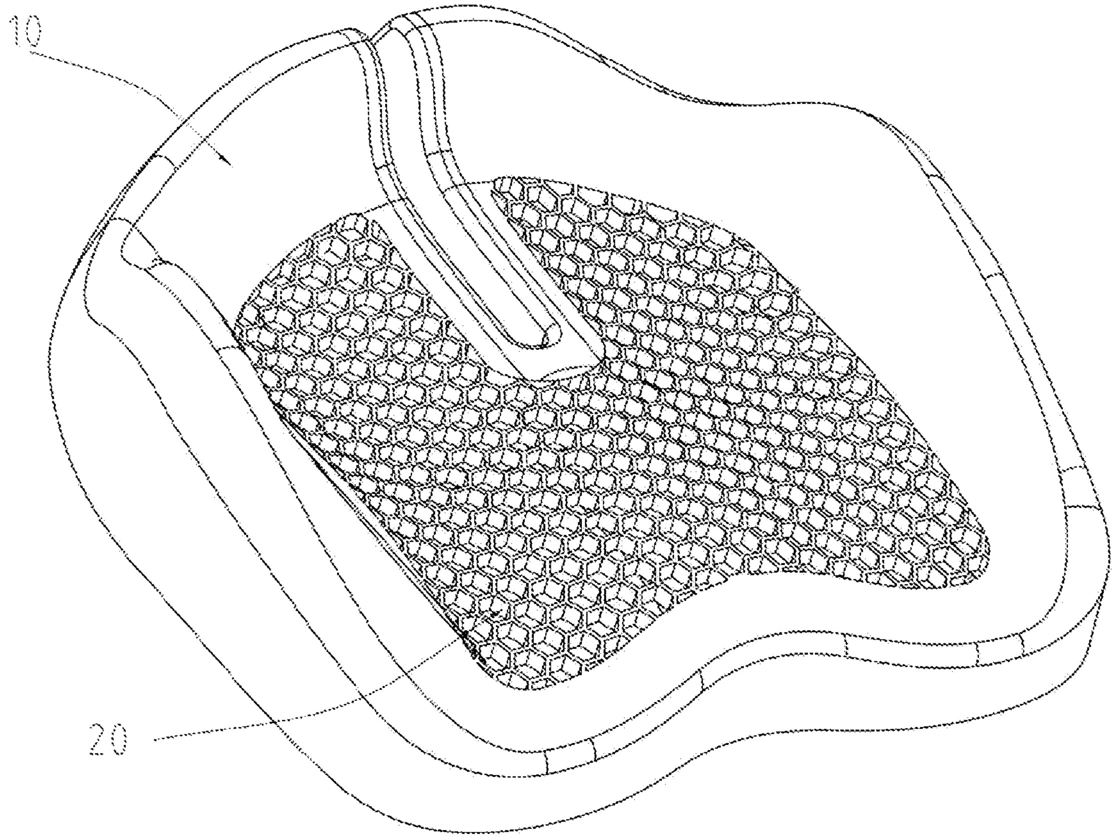
FIG. 3 is a schematic structural diagram of another seat cushion according to the present disclosure.
Figure 4:
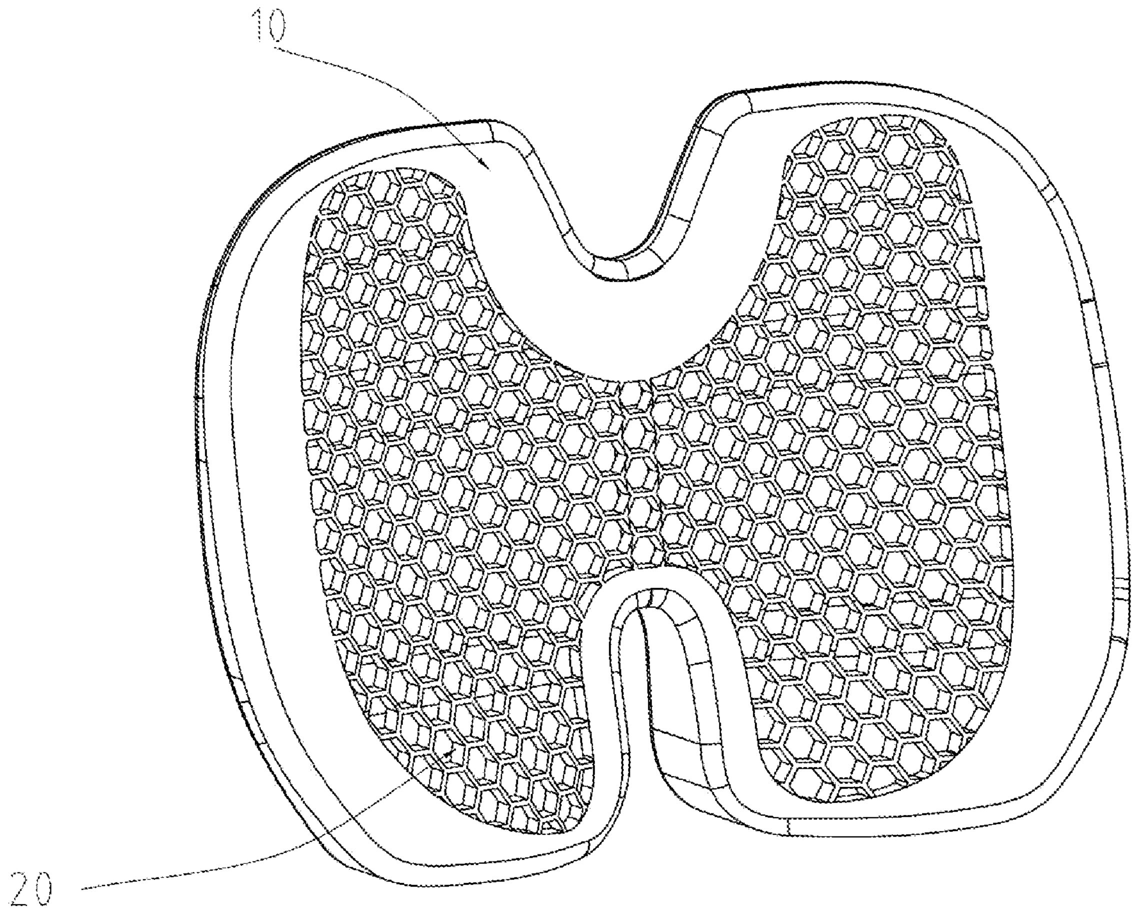
FIG. 4 is a schematic structural diagram of a back cushion according to the present disclosure.
Figure 5:
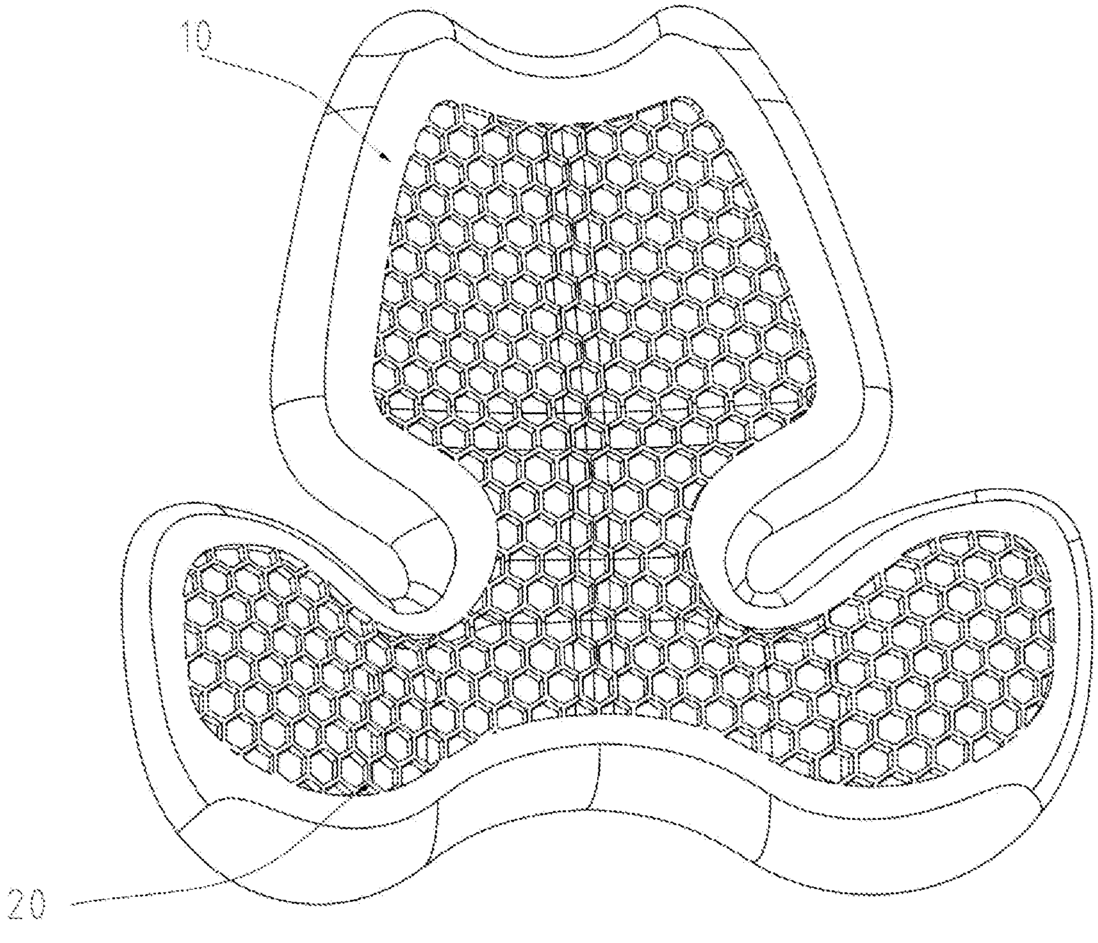
FIG. 5 is a schematic structural diagram of another back cushion according to the present disclosure.
Figure 6:
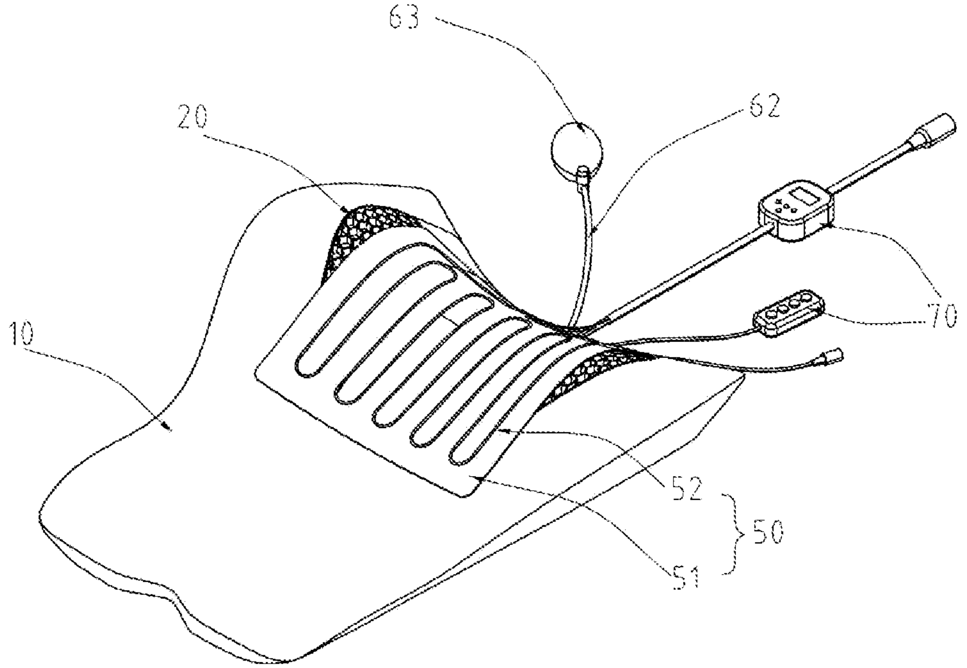
FIG. 6 is a schematic diagram of an overall structure from one angle of the present disclosure.
Figure 7:
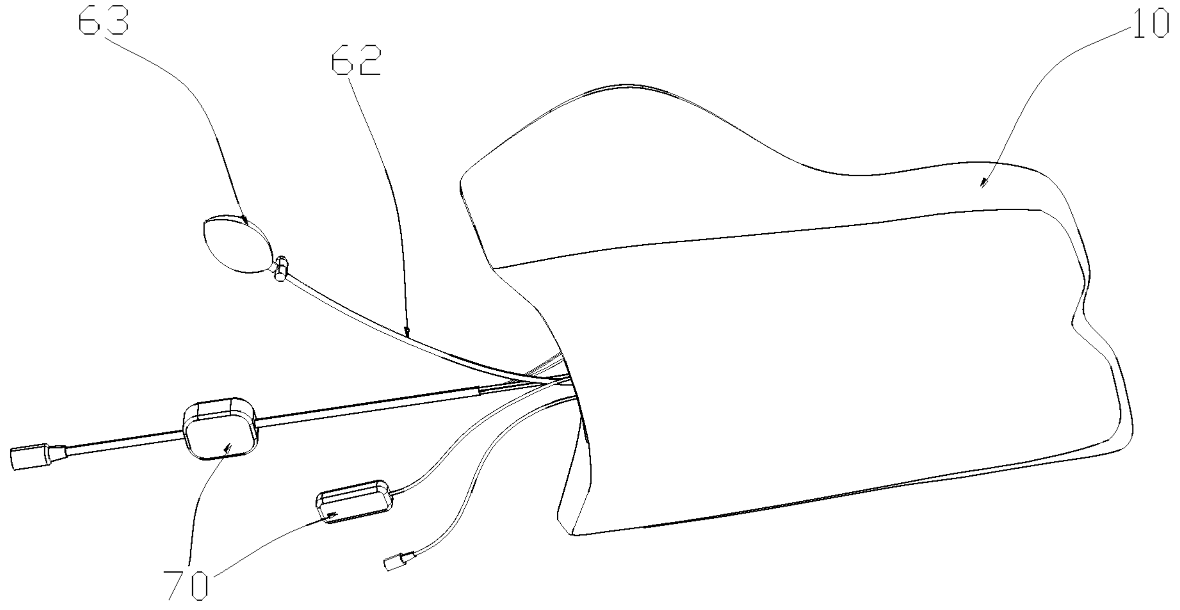
FIG. 7 is a schematic diagram of an overall structure from another angle of the present disclosure.
Figure 8:
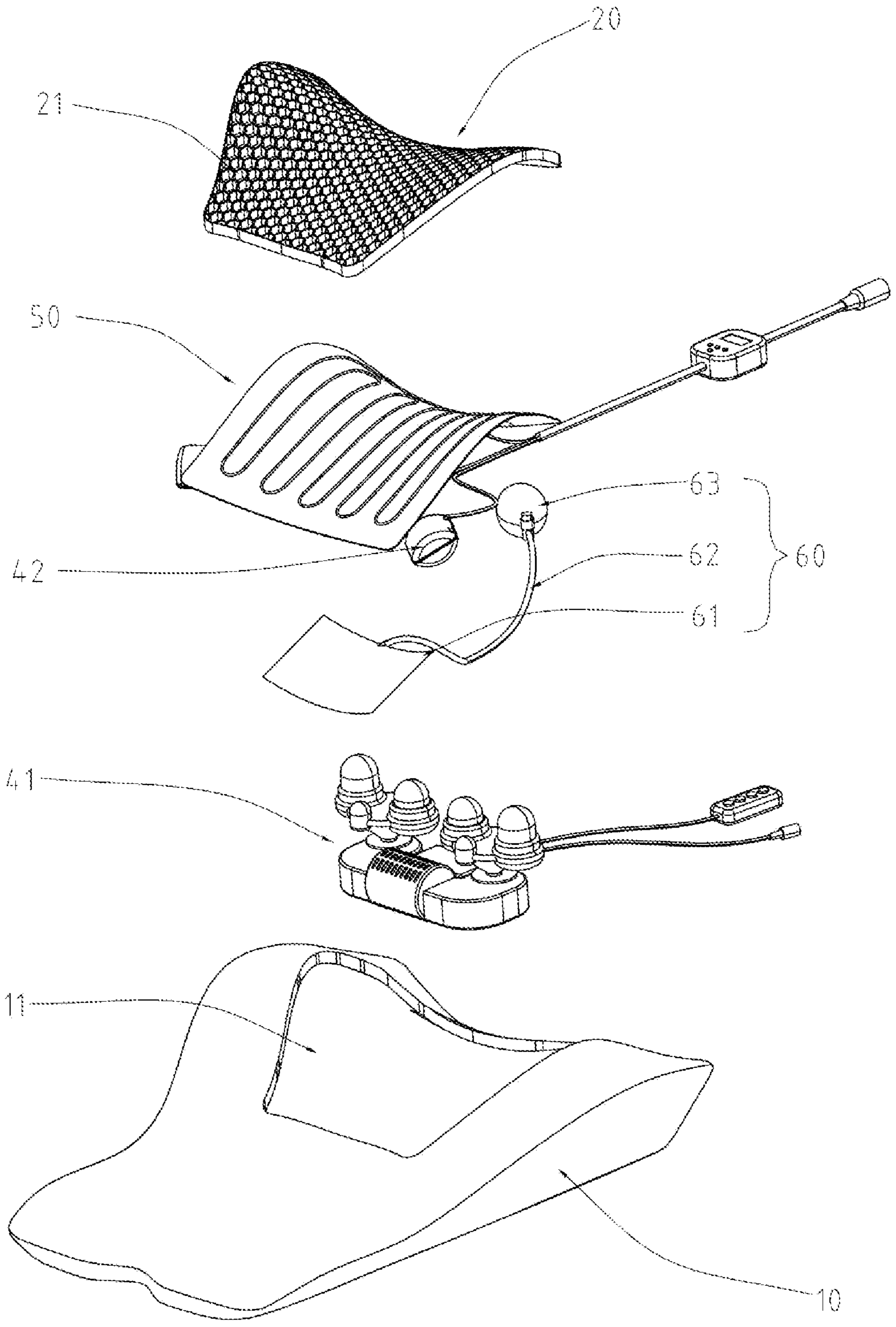
FIG. 8 is a schematic structural diagram of an exploded view from one angle of the present disclosure.
Figure 9:
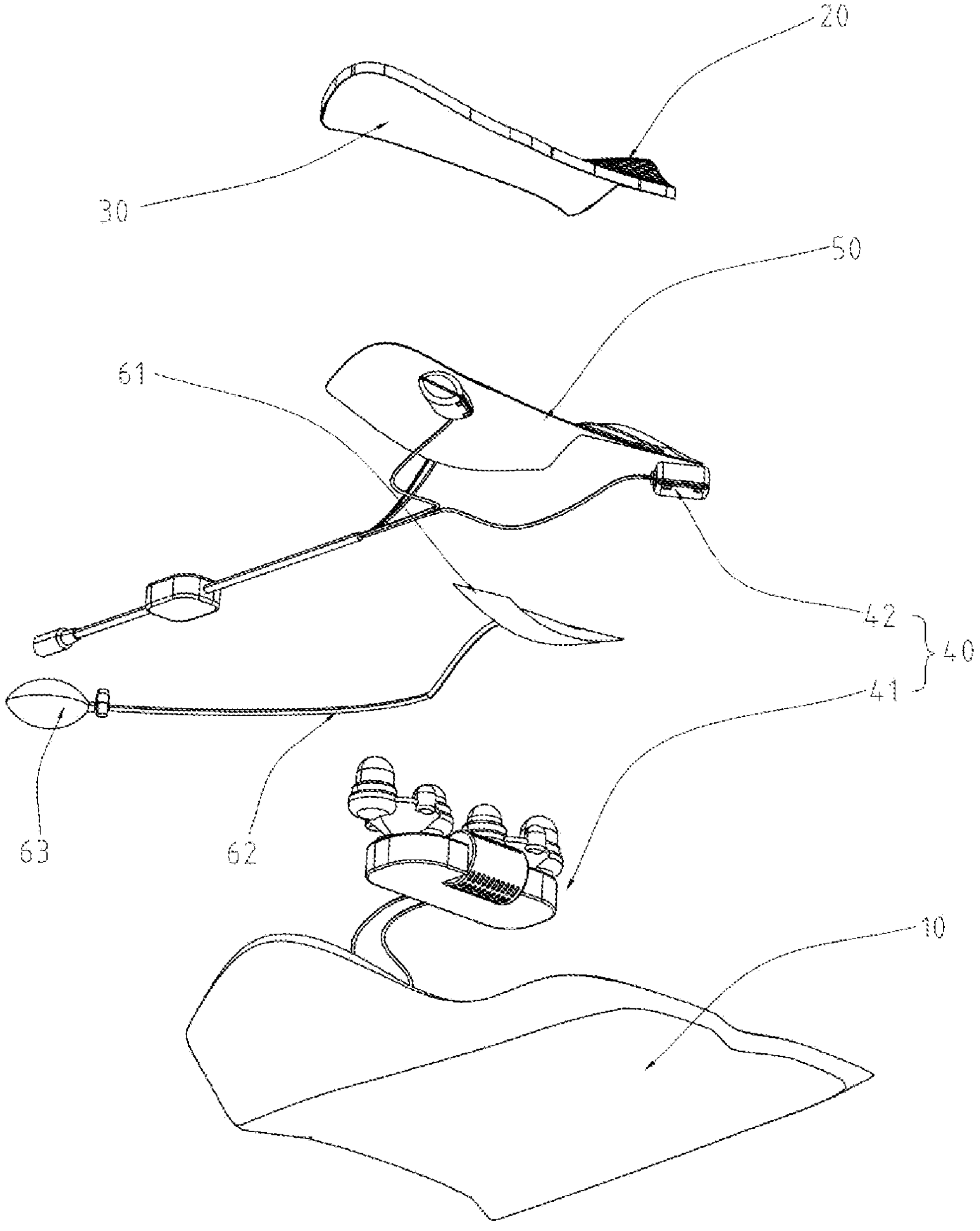
FIG. 9 is a schematic structural diagram of an exploded view from another angle of the present disclosure.
Figure 10:
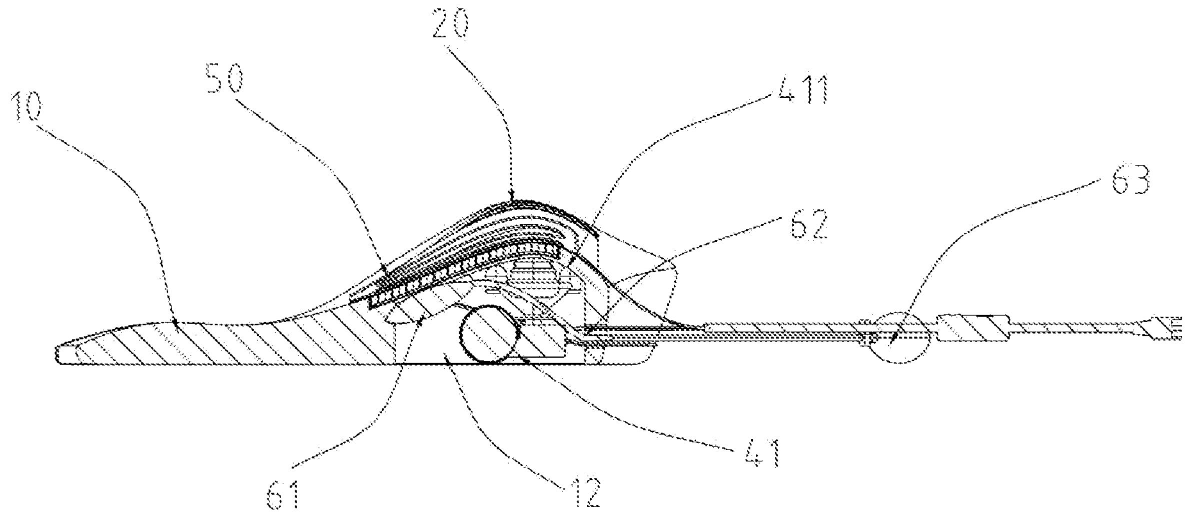
FIG. 10 is a schematic diagram of a cross-sectional view of the present disclosure.
Figure 11:
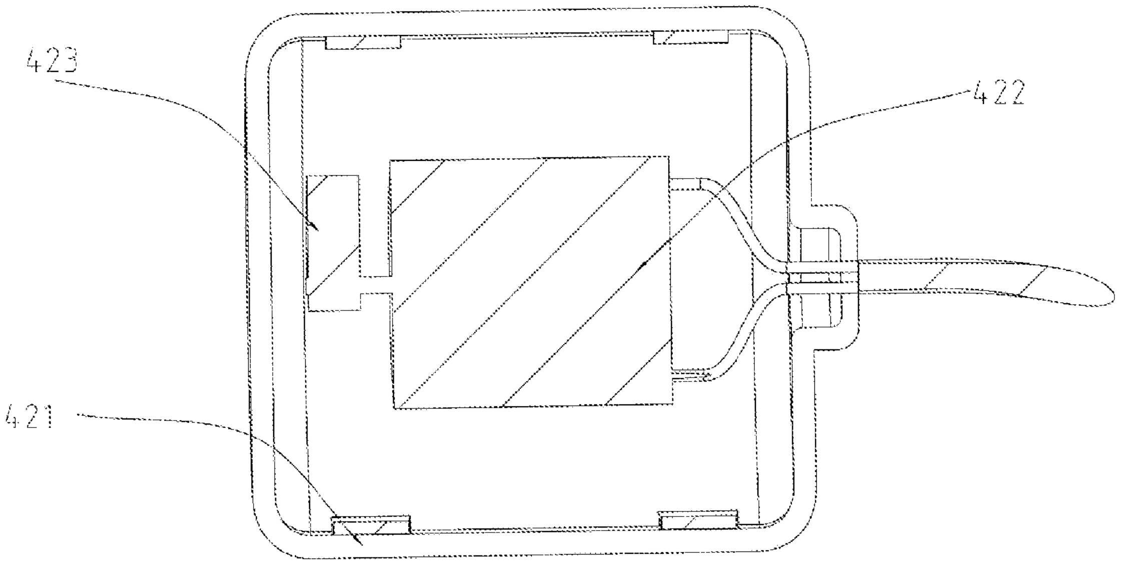
FIG. 11 is a cross-sectional view of a vibration component in the present disclosure.
Figure 12:
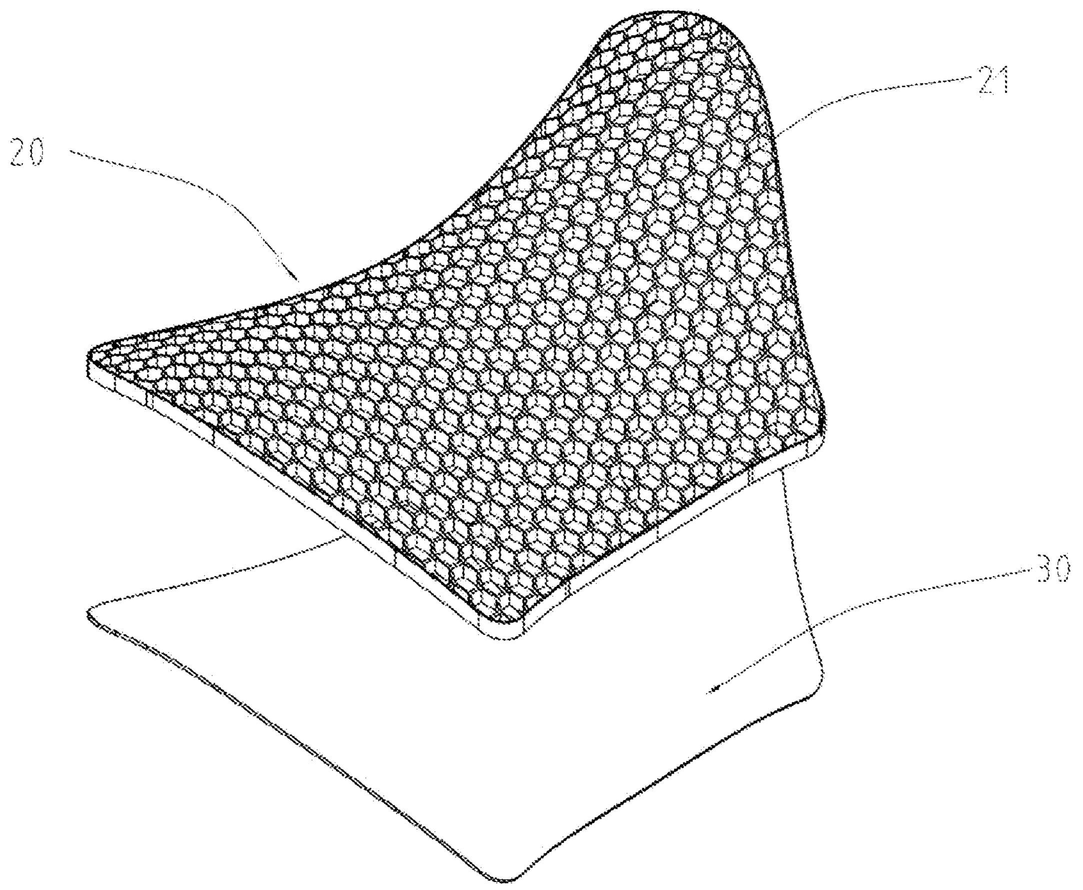
FIG. 12 is a schematic structural diagram of an exploded view of supporting silicone and a connecting net according to the present disclosure.

Referring to FIG. 1 to FIG. 12, a memory foam cushion body includes:

- a memory foam main body 10, wherein the memory foam main body 10 is provided with an upper surface and a lower surface; and
- supporting silicone 20, wherein the supporting silicone 20 is arranged on the upper surface of the memory foam main body 10; the supporting silicone 20 is provided with a through hole 21 penetrating through an upper surface and a lower surface of the supporting silicone 20; and an air layer is formed between the upper surface of the supporting silicone 20, an inner wall of the through hole 21, and the upper surface of the memory foam main body 10.

Due to the arrangement of the above structure, during use, the body of a user is in contact with the upper surface of the supporting silicone, and the upper surface of the supporting silicone supports the body of the user. The supporting silicone is provided with the through hole penetrating through the upper surface and the lower surface of the supporting silicone, so that the air layer formed by air exists between the surface of the body and the upper surface of the memory foam main body. Thus, this product can prevent direct contact between memory foam and the body of the user while retaining the characteristic of slow recovery of a memory foam product. The air layer formed by the air can improve the breathability of the cushion body product and also prevent heat from being accumulated on the surfaces of the memory foam main body, so that user experience is improved.

In this embodiment, the memory foam cushion body further includes a connecting net 30. One side of the connecting net 30 is connected to the upper surface of the memory foam main body 10, and the other side of the connecting net 30 is connected to the lower surface of the supporting silicone 20. Due to the arrangement of the above structure, the connecting net is connected to the bottom of the supporting silicone. As the connecting net has multiple pores on both of the surfaces, the stability of connection between the lower surface of the supporting silicone and the connecting net is greatly improved. The connecting net is connected to the upper surface of the memory foam main body, which can also further improve the stability of connection between the supporting silicone and the connecting net. As the supporting silicone is provided with the through hole penetrating through the upper surface and the lower surface of the supporting silicone, if the lower surface of the supporting silicone having a small area is directly connected to the memory foam main body, the connection will be unstable. Adding the connecting net, which has an area larger than the area of the lower surface of the supporting silicone, allows the supporting silicone connected to the connecting net to be more stably connected to the memory foam body.

In this embodiment, the through hole 21 is hexagonal, so that the supporting silicone 20 is honeycomb-shaped. Due to the arrangement of the above structure, the honeycomb-shaped supporting silicone has a stable structure. In a case that the overall area of the supporting silicone does not change, the area of the through hole in the middle is larger, which further enlarges an area of the air layer formed by air and improves the breathability of the product. The structure is stable, which can also effectively support the body of the user. Further, the through hole may also be in other shapes, such as a circular shape, a pentagon, a quadrangle, a triangle, or other shapes that can be simply replaced.

In this embodiment, the memory foam cushion body further includes a massage component 40. The massage component 40 is arranged in the memory foam main body 10. A working surface of the massage component 40 is arranged in a manner of facing the upper surface of the memory foam main body 10. Due to the arrangement of the above structure, the working surface of the massage component is arranged in the manner of facing the upper surface of the memory foam main body. During use, the massage component can be started to work. The body of the user is in contact with the upper surface of the memory foam main body, so that the user can be massaged and feel more comfortable. The product has more functions and can effectively relax the body of the user and improve the user experience.

In this embodiment, the massage component 40 includes a massage member 41 and a vibration member 42. The massage member 41 and the vibration member 42 are arranged side by side in the memory foam main body 10. Due to the arrangement of the above structure, the massage component includes the massage member and the vibration member. The massage component is provided with massage heads. The motor drives the massage heads to rotate and/or extend and retract, so that the massage heads come into contact with and press the body of the user regularly to smooth partial blood flow of the body of the user and improve the health of the user. And the vibration member promotes partial blood circulation, relaxes muscles and relieves mental stress through vibration. The two different massage modes jointly work on the body of the user, so that the massage effect is better, and the use experience of the user is better.

In this embodiment, the massage member 41 includes several massage heads 411. The massage heads 411 are arranged in a manner of facing to the upper surface of the memory foam main body 10. Due to the arrangement of the above structure, the body of the user generally contacts the upper surface of the memory foam main body, and the massage heads that are arranged in the manner of facing to the upper surface of the memory foam main body can be in direct contact with the body of the user, so that it is more convenient for the user.

In this embodiment, the vibration member 42 includes a shell 421, a motor 422, and an eccentric block 423. The eccentric block 423 is connected to an output end of the motor 422. The motor 422 and the eccentric block 423 are arranged in the shell 421. The motor 422 drives the eccentric block 423 to rotate. The eccentric block 423 drives the motor 422 and the shell 421 to vibrate. Due to the arrangement of the above structure, an output shaft of the motor is connected to the eccentric block; the motor is arranged in the shell; the motor drives the eccentric block to rotate eccentrically; and then the motor and the shell are driven to vibrate, so that the structure is simple, and the vibration effect is good.

In this embodiment, the memory foam cushion body further includes a heating component 50. The heating component 50 is arranged on the upper surface of the supporting silicone 20. Due to the arrangement of the above structure, the heating component is arranged on the upper surface of the supporting silicone and is in direct contact with the body of the user, so that heating can be effectively performed, loss of heat during transferring can be reduced, and the heating effect is improved. When it turns cold or a room temperature is low, the cushion body can be kept at a comfortable temperature, which improves the use experience of the user.

In this embodiment, the heating component 50 includes supporting cloth 51 and a heating member 52. The heating member 52 is connected to the supporting cloth 51 and uniformly fully distributed in the supporting cloth 51. Due to the arrangement of the above structure, the heating member is uniformly arranged in the supporting cloth to keep the heating effect of each part consistent, making the surface of the body of the user heated uniformly and improving the use experience of the user. On the one hand, the supporting cloth is soft and can deform. The supporting cloth is used to carry the heating member to adapt to cushion bodies with more shapes. When the user sits on the cushion body, the supporting cloth can deform with the cushion body, which improves the comfortableness of the product. On the other hand, the supporting cloth is breathable. The supporting cloth is arranged on the upper surface of the supporting silicone. The air layer is formed between the supporting cloth, the supporting silicone, and the upper surface of the memory foam main body, so that the product can prevent direct contact between memory foam and the body of the user while retaining the characteristic of slow recovery of a memory foam product. The air layer formed by the air can improve the breathability of the cushion body product and also prevent heat from being accumulated on the surfaces of the memory foam main body, so that the use experience of the user is improved.

In this embodiment, the heating member 52 consist of one or more of resistance wire, carbon fiber, and graphene. Due to the arrangement of the above structure, one or more of the resistance wire, the carbon fiber, and the graphene can be used as the heating member, which can improve the stability of the heating member, and the heating effect is good.

In this embodiment, the memory foam cushion body further includes an air bag component 60. At least part of the air bag component 60 is arranged in the memory foam main body 10. The air bag component 60 can expand or retract according to inflation and deflation situations. Due to the arrangement of the above structure, during use, the user can inflate or deflate the air bag component to cause the air bag component to expand or retract. By adjusting a size of an air bag, the user can adjust the height and shape of the cushion body conveniently to improve comfort.

In this embodiment, the air bag component 60 includes an air bag 61, an air hose 62, and an inflation and deflation device 63. The air bag 61 is arranged in the memory foam main body 10. One end of the air hose 62 is communicated to the air bag 61, and the other end of the air hose 62 is threaded out of the memory foam main body 10 and is communicated to the inflation and deflation device 63. Due to the arrangement of the above structure, the user can control the inflation and deflation device 63 to inflate or deflate the air bag. By adjusting the size of the air bag 61, the user can adjust the height and shape of the cushion body conveniently to improve comfort.

In this embodiment, the memory foam cushion body further includes a wire control device 70. The wire control device 70 is electrically communicated to the massage component 40 and the heating component 50. The wire control device 70 is configured to control the massage component 40 and the heating component 50. Due to the arrangement of the above structure, during use, the user can adjust the wire control device to turn on or turn off the massage component and/or the heating component, so that the user can select a corresponding function according to the needs conveniently.

Referring to FIG. 1 to FIG. 12, a memory foam seat cushion includes:

- a memory foam main body 10, wherein the memory foam main body 10 is provided with an upper surface and a lower surface, and the upper surface of the memory foam main body 10 is provided with an accommodating slot 11;
- supporting silicone 20, wherein at least part of the supporting silicone 20 is arranged in the accommodating slot 11; the supporting silicone 20 is provided with a through hole 21 penetrating through an upper surface and a lower surface of the supporting silicone 20; the upper surface of the supporting silicone 20 is exposed out of the accommodating slot 11; and an air layer is formed between the upper surface of the supporting silicone 20, an inner wall of the through hole 21, and the upper surface of the memory foam main body 10.

Due to the arrangement of the above structure, during use, the body of a user is in contact with the upper surface of the supporting silicone, and the upper surface of the supporting silicone supports the body of the user. The supporting silicone is provided with the through hole penetrating through the upper surface and the lower surface of the supporting silicone, so that the air layer formed by air exists between the surface of the body and the upper surface of the memory foam main body. Thus, this product can prevent direct contact between memory foam and the body of the user while retaining the characteristic of slow recovery of a memory foam product. The air layer formed by the air can improve the breathability of the seat cushion product and also prevent heat from being accumulated on the surfaces of the memory foam main body, so that the use experience of the user is improved. The upper surface of the memory foam main body is provided with the accommodating slot, and the supporting silicone is arranged in the accommodating slot, so that the supporting silicone and the memory foam main body are connected more stably. Preferably, the height of the supporting silicone matches the depth of the accommodating slot of the memory foam main body, so that the upper surface of the supporting silicone and the upper surface of the memory foam main body are in the same plane.

In this embodiment, the memory foam seat cushion further includes a connecting net 30. One side of the connecting net 30 is connected to an inner wall of the accommodating slot 11, and the other side of the connecting net 30 is connected to the lower surface of the supporting silicone 20. Due to the arrangement of the above structure, the connecting net is connected to a bottom of the supporting silicone. As the connecting net has multiple pores on both of the surfaces, the stability of connection between the lower surface of the supporting silicone and the connecting net is greatly improved. The connecting net is connected to the upper surface of the memory foam main body, which can also further improve the stability of connection between the supporting silicone and the connecting net. As the supporting silicone is provided with the through hole penetrating through the upper surface and the lower surface of the supporting silicone, if the lower surface of the supporting silicone having a small area is directly connected to the memory foam main body, the connection will be unstable. Adding the connecting net, which has an area larger than the area of the lower surface of the supporting silicone, allows the supporting silicone connected to the connecting net to be more stably connected to the memory foam body.

In this embodiment, the through hole 21 is hexagonal, so that the supporting silicone 20 is honeycomb-shaped. Due to the arrangement of the above structure, the honeycomb-shaped supporting silicone has a stable structure. In a case that the overall area of the supporting silicone does not change, the area of the through hole in the middle is larger, which further enlarges an area of the air layer formed by air and improves the breathability of the product. The structure is stable, which can also effectively support the body of the user. Further, the through hole may also be in other shapes, such as a circular shape, a pentagon, a quadrangle, a triangle, or other shapes that can be simply replaced.

In this embodiment, the memory foam seat cushion further includes a massage component 40. An accommodating cavity 12 is arranged in the memory foam main body 10. The massage component 40 is arranged in the accommodating cavity 12; and a working surface of the massage component 40 is arranged in a manner of facing the upper surface of the memory foam main body 10. Due to the arrangement of the above structure, the working surface of the massage component is arranged in the manner of facing the upper surface of the memory foam main body. During use, the massage component can be started to work. The body of the user is in contact with the upper surface of the memory foam main body, so that the user can be massaged and feel more comfortable. The product has more functions and can effectively relax the body of the user and improve the user experience.

In this embodiment, the massage component 40 includes a massage member 41 and a vibration member 42. The massage member 41 and the vibration member 42 are arranged side by side in the memory foam main body 10. Due to the arrangement of the above structure, the massage component includes the massage member and the vibration member. The massage component is provided with massage heads. The motor drives the massage heads to rotate and/or extend and retract, so that the massage heads come into contact with and press the body of the user regularly to smooth partial blood flow of the body of the user, and improve the health of the user. The vibration member promotes partial blood circulation, relaxes the muscles, and relieves the mental stress through vibration. The two different massage modes jointly work on the body of the user, so that the massage effect is better, and the user experience is better.

In this embodiment, the massage member 41 includes several massage heads 411. The massage heads 411 are arranged in a manner of facing the upper surface of the memory foam main body 10. Due to the arrangement of the above structure, the body of the user generally contacts the upper surface of the memory foam main body, and the massage heads that are arranged in the manner of facing the upper surface of the memory foam main body can be in direct contact with the body of the user, so that it is more convenient for the user.

In this embodiment, the vibration member 42 includes a shell 421, a motor 422, and an eccentric block 423. The eccentric block 423 is connected to an output end of the motor 422. The motor 422 and the eccentric block 423 are arranged in the shell 421. The motor 422 drives the eccentric block 423 to rotate. The eccentric block 423 drives the motor 422 and the shell 421 to vibrate. Due to the arrangement of the above structure, an output shaft of the motor is connected to the eccentric block; the motor is arranged in the shell; the motor drives the eccentric block to rotate eccentrically; and then the motor and the shell are driven to vibrate, so that the structure is simple, and the vibration effect is good.

In this embodiment, the memory foam cushion body further includes a heating component 50. The heating component 50 is arranged on the upper surface of the supporting silicone 20. Due to the arrangement of the above structure, the heating component is arranged on the upper surface of the supporting silicone and is in direct contact with the body of the user, so that heating can be effectively performed, loss of heat during transferring can be reduced, and the heating effect is improved. When it turns cold or a room temperature is low, the seat cushion can be kept at a comfortable temperature, which improves the user experience.

In this embodiment, the heating component 50 includes supporting cloth 51 and a heating member 52. The heating member 52 is connected to the supporting cloth 51 and uniformly fully distributed in the supporting cloth 51. Due to the arrangement of the above structure, the heating member is uniformly arranged in the supporting cloth to keep the heating effect of each part consistent, making the surface of the body of the user heated uniformly and improving the user experience. On the one hand, the supporting cloth is soft and can deform. The supporting cloth is used to carry the heating member to adapt to cushion bodies with more shapes. When the user sits on the seat cushion, the supporting cloth can deform with the seat cushion, which improves the comfortableness of the product. On the other hand, the supporting cloth is breathable. The supporting cloth is arranged on the upper surface of the supporting silicone. The isolation air layer is formed between the supporting cloth, the supporting silicone, and the upper surface of the memory foam main body, so that the product can prevent direct contact between memory foam and the body of the user while retaining the characteristic of slow recovery of a memory foam product. The air layer can improve the breathability of the seat cushion product and also prevent heat from being accumulated on the surfaces of the memory foam main body, so that the user experience is improved.

In this embodiment, the heating member 52 consists of one or more of resistance wire, carbon fiber, and graphene. Due to the arrangement of the above structure, one or more of the resistance wire, the carbon fiber, and the graphene can be used as the heating member, which can improve the stability of the heating member, and the heating effect is good.

In this embodiment, the memory foam cushion body further includes an air bag component 60. At least part of the air bag component 60 is arranged in the memory foam main body 10. The air bag component 60 can expand or retract according to inflation and deflation situations. Due to the arrangement of the above structure, during use, the user can inflate or deflate the air bag component to cause the air bag component to expand or retract. By adjusting the size of the air bag, the user can adjust the height and shape of the cushion body conveniently to improve comfort.

In this embodiment, the air bag component 60 includes an air bag 61, an air hose 62, and an inflation and deflation device 63. The air bag 61 is arranged in the memory foam main body 10. One end of the air hose 62 is communicated to the air bag 61, and the other end of the air hose 62 is threaded out of the memory foam main body 10 and is communicated to the inflation and deflation device 63. Due to the arrangement of the above structure, the user can control the inflation and deflation device 63 to inflate or deflate the air bag. By adjusting the size of the air bag 61, the user can adjust the height and shape of the cushion body conveniently to improve comfort.

In this embodiment, the memory foam cushion body further includes a wire control device 70. The wire control device 70 is electrically communicated to the massage component 40 and the heating component 50. The wire control device 70 is configured to control the massage component 40 and the heating component 50. Due to the arrangement of the above structure, during use, the user can adjust the wire control device to turn on or turn off the massage component and/or the heating component, so that the user can select a corresponding function according to the needs conveniently.

One or more implementation modes are provided above in combination with specific contents, and it is not deemed that the specific implementation of the present disclosure is limited to these specifications. Any technical deductions or replacements approximate or identical to the method and structure of the present disclosure or made under the concept of the present disclosure shall fall within the scope of protection of the present disclosure.

What is claimed is:

1. A memory foam cushion body, comprising:

a memory foam main body, wherein the memory foam main body is provided with an upper surface and a lower surface;

supporting silicone, wherein the supporting silicone is arranged on the upper surface of the memory foam main body; the supporting silicone is provided with a through hole penetrating through an upper surface and a lower surface of the supporting silicone; and an air layer is formed between the upper surface of the supporting silicone, an inner wall of the through hole, and the upper surface of the memory foam main body;

a connecting net, wherein one side of the connecting net is connected to the upper surface of the memory foam main body, and the other side of the connecting net is connected to the lower surface of the supporting silicone; and a massage component, wherein the massage component is arranged in the memory foam main body; and a working surface of the massage component is arranged in a manner of facing the upper surface of the memory foam main body.

2. The memory foam cushion body according to claim 1, wherein the through hole is hexagonal, so that the supporting silicone is honeycomb-shaped.

3. The memory foam cushion body according to claim 1, wherein the massage component comprises a massage member and a vibration member;

and the massage member and the vibration member are arranged side by side in the memory foam main body.

4. The memory foam cushion body according to claim 3, wherein the massage member comprises several massage heads; and the massage heads are arranged in a manner of facing the upper surface of the memory foam main body.

5. The memory foam cushion body according to claim 3, wherein the vibration member comprises a shell, a motor, and an eccentric block; the eccentric block is connected to an output end of the motor; the motor and the eccentric block are arranged in the shell; the motor drives the eccentric block to rotate; and the eccentric block drives the motor and the shell to vibrate.

6. The memory foam cushion body according to claim 1, further comprising a heating component, wherein the heating component is arranged on the upper surface of the supporting silicone.

7. The memory foam cushion body according to claim 6, wherein the heating component comprises supporting cloth and a heating member; and the heating member is connected to the supporting cloth and uniformly fully distributed in the supporting cloth.

8. The memory foam cushion body according to claim 7, wherein the heating member consists of one or more of resistance wire, carbon fiber, and graphene.

9. A memory foam seat cushion, comprising:

a memory foam main body, wherein the memory foam main body is provided with an upper surface and a lower surface, and the upper surface of the memory foam main body is provided with an accommodating slot;

supporting silicone, wherein at least part of the supporting silicone is arranged in the accommodating slot; the supporting silicone is provided with a through hole penetrating through an upper surface and a lower surface of the supporting silicone; the upper surface of the supporting silicone is exposed out of the accommodating slot; and an air layer is formed between the upper surface of the supporting silicone, an inner wall of the through hole, and the upper surface of the memory foam main body;

a connecting net, wherein one side of the connecting net is connected to an inner wall of the accommodating slot, and the other side of the connecting net is connected to the lower surface of the supporting silicone; and a massage component, wherein an accommodating cavity is arranged in the memory foam main body; the massage component is arranged in the accommodating cavity; and a working surface of the massage component is arranged in a manner of facing the upper surface of the memory foam main body.

10. The memory foam seat cushion according to claim 9, wherein the through hole is hexagonal, so that the supporting silicone is honeycomb-shaped.

11. The memory foam seat cushion according to claim 9, wherein the massage component comprises a massage member and a vibration member;

and the massage member and the vibration member are arranged side by side in the memory foam main body.

12. The memory foam seat cushion according to claim 11, wherein the massage member comprises several massage heads; and the massage heads are arranged in a manner of facing the upper surface of the memory foam main body.

13. The memory foam seat cushion according to claim 11, wherein the vibration member comprises a shell, a motor, and an eccentric block; the eccentric block is connected to an output end of the motor; the motor and the eccentric block are arranged in the shell; the motor drives the eccentric block to rotate; and the eccentric block drives the motor and the shell to vibrate.

14. The memory foam seat cushion according to claim 9, further comprising a heating component, wherein the heating component is arranged on the upper surface of the supporting silicone.

15. The memory foam seat cushion according to claim 14, wherein the heating component comprises supporting cloth and a heating member; and the heating member is connected to the supporting cloth and uniformly fully distributed in the supporting cloth.

16. The memory foam seat cushion according to claim 15, wherein the heating member consists of one or more of resistance wire, carbon fiber, and graphene.

* * * * *